United States Patent [19]

Seidel

[11] 4,297,254
[45] Oct. 27, 1981

[54] LOW TEMPERATURE CURING EPOXY RESIN

[75] Inventor: Martin P. Seidel, Monroeville, Pa.

[73] Assignee: Westinghouse Electric Corp., Pittsburgh, Pa.

[21] Appl. No.: 98,108

[22] Filed: Nov. 28, 1979

[51] Int. Cl.³ .............................................. C08G 59/50
[52] U.S. Cl. .............................. 260/18 EP; 528/112
[58] Field of Search ..................... 260/18 EP; 528/112

[56] References Cited

U.S. PATENT DOCUMENTS

| | | | |
|---|---|---|---|
| 2,632,022 | 3/1953 | Bortnick | 260/563 |
| 2,955,138 | 10/1960 | McKeever et al. | 260/563 |
| 3,526,607 | 9/1970 | Brown et al. | 260/18 EP |
| 3,784,583 | 1/1974 | Smith | 528/112 |
| 3,823,107 | 7/1974 | Cotton | 260/237 N |
| 3,974,113 | 8/1976 | Sassano et al. | 260/18 EP |
| 4,069,202 | 1/1978 | Carey | 260/18 EP |
| 4,180,607 | 12/1979 | Sasaki et al. | 528/112 |

FOREIGN PATENT DOCUMENTS 722154 1/1955 United Kingdom ................ 528/112

Primary Examiner—Ronald W. Griffin
Attorney, Agent, or Firm—R. D. Fuerle

[57] ABSTRACT

A methane diamine cured solventless liquid epoxy composition is disclosed. The composition contains an oil-modified epoxy rsin having an EEW of about 300 to 600 which is formed by reacting about 5 to about 50% of a triglyceride of a $C_{10}$ to $C_{20}$ fatty acid with about 50 to about 95% of an epoxy resin having at least one aliphatic hydroxyl group per molecule. The composition also contains about 0.01 to about 0.3 phr of a catalyst, up to about 80% of a glycidyl either of a phenol, about 1 equivalent, ±20%, of methane diamine, and about 0.2 to 3% of an accelerator.

11 Claims, No Drawings

LOW TEMPERATURE CURING EPOXY RESIN

BACKGROUND OF THE INVENTION

A broad range of ultrasonic transmission and receiving systems are deployed in salt water by means of electric cables. In order to maintain the electrical insulation of the cable connections, the various existing cable junctions must be encapsulated in a resin system which has good electrical properties, a high order of adhesion to the various cable sheaths and metallic components and is immune to the deteriorating effects of sea water. Ideally, such encapsulating system should be capable of being applied under adverse field conditions by unskilled personnel.

The encapsulant which is presently used to make there terminations and also cable splices is an epoxy resin crosslinked with a polyamide-imide sold under the trademark "Versamid." This encapsulating system is quite viscous and entraps large quantities of air during the catalyst-base resin-mixing process. Unless the air is removed by means of a vacuum-degassing process, the encapsulated connectors will contain large voids and porous areas which render them useless for the intended application. Degassing is done by placing a container of the catalyzed mixed resin system in a vacuum desiccator and holding the resin at reduced pressures until it no longer emits gas bubbles. Great care must be exercised in the degassing operation because the optimum resin temperature for degassing is 50° C. At lower temperatures, the resin system is so viscous that it cannot be deaerated satisfactorily, and at a temperature of 60° C. the system has a working life of only 5 to 10 minutes. Even a properly degassed system has such a high viscosity that great care must be exercised in filling the space in order to prevent the inclusion of voids caused by fold-overs in the poured resin stream. The high degree of precision needed to successfully use this system makes it difficult to use it in the field.

In spite of these problems, the present epoxy resin system does have the advantages of excellent adhesion to the various system components, a range of flexibilities, transparency, and the capacity to cure in 24 hours at room temperature. The ability of these resins to cure at temperatures below 80° C. is a critically important property because the delicate electronic devices which are encapsulated by the resins can be damaged at temperatures over 80° C.

SUMMARY OF THE INVENTION

I have discovered that menthane diamine will cure an oil-modified epoxy resin at temperatures below 80° C. The resin of this invention is prepared as two components, both of which can be stored indefinitely. The resin has a lower viscosity than the resin presently being used and its electrical properties are comparable. Surprisingly, its adhesion is superior and therefore it is expected to be more effective at keeping the sea water away from the electronic components. The resin is easy to use and can be used in the field without difficulty.

PRIOR ART

U.S. Pat. No. 3,974,113 describes a liquid oil-modified epoxy resin made with lithium ricinoleate. The curing conditions are listed as about 135° to about 150° C. for about 1 to 4 hours using added anhydrides. Affidavits in the file wrapper show that amines break the emulsion into two phases.

U.S. Pat. Nos. 3,823,107 and 3,526,607 disclose epoxy resins which are cured with a polyamine.

U.S. Pat. Nos. 2,632,022 and 2,955,138 disclose the preparation of menthane diamine.

DESCRIPTION OF THE PREFERRED EMBODIMENT

The composition of this invention contains an oil-modified epoxy resin which is a reaction product of an oil and an epoxy resin. The oil may be a drying oil or a non-drying oil and may be saturated or unsaturated, but it must be a triglyceride of a fatty acid containing 10 to 20 carbon atoms. Linseed oil is preferred as it has been found to work very well, but tall oil, olive oil, corn oil, fish oils, and other oils can also be used.

The epoxy resin used in preparing the oil-modified epoxy resin must average at least one aliphatic hydroxyl group per molecule. It should also have a low ash content, that is, less than 0.1% (all percentages herein are by weight) ash. ("Ash" is the silicate, oxide, carbonate, or hydroxide of calcium, magnesium, sodium, potassium, iron, or mixtures thereof.) A low ash content is required because ash can render the catalyst insoluble and prevent a reaction from occurring. The epoxy should also have an acid content of less than about 0.01% as acid can also ruin the catalyst.

The catalyst is preferably lithium ricinoleate as it is reactive and soluble and works very well, but other alkali or alkaline earth metal salts or other high molecular weight fatty acids can also be used. Other catalysts may also be found to be suitable.

The composition used to prepare the oil-modified epoxy resin should contain about 5 to about 50% oil, about 50 to about 95% epoxy resin, and about 0.01 to about 0.3 phr (parts per hundred parts resin where resin means oil plus epoxy) of the catalyst. Preferably, the composition used to prepare the oil-modified epoxy resin contains about 35 to 45% oil, about 55 to about 65% epoxy, and about 0.01 to about 0.05 phr of a catalyst. There is a relationship between the ratio of oil to expoxy in the composition as more oil results in a composition having a lower viscosity. A lower viscosity can also be obtained by using epoxy resins having lower epoxy equivalent weights (EEW).

The oil-modified epoxy resin is prepared by mixing the oil, epoxy and catalyst together. Initially, the oil and the epoxy will be incompatible but as the mixture is heated above 200° C., they become compatible and a clear solution is produced. The mixture should be heated at about 200° to above 260° C. until the epoxy equivalent weight is about 300 to 400. The heating should be conducted with nitrogen bubbling through the mixture to prevent the oil from reacting with oxygen in the air.

An alternative procedure is to use all of the oil and only about 20 to about 50% of the epoxy to prepare the oil-modified epoxy resin and to add the rest of the epoxy resin after preparation of the oil-modified epoxy resin at room temperature. If this later procedure is used, the reaction is heated at 200° to 260° C. until the epoxy equivalent weight is about 400 to 600. A different epoxy resin may be used than was used to prepare the oil-modified epoxy resin.

Until now oil-modified epoxy resins could not be cured using an amine as a curing agent. Only anhydrides would cure oil-modified epoxy resins to a clear solid state. Moreover, even when anhydride-curing agents were used, the curing temperature described in U.S. Pat. No. 3,974,113 was a minimum of 135° C. I have found that one particular amine, menthane diamine will cure an oil-modified epoxy resin to a clear solid state. Moreover, menthane diamine will cure an oil-modified epoxy resin at temperatures as low as 75° C.

In order for the menthane diamine cure to occur, however, an accelerator must also be present. The acclerator is preferably tris (dimethylaminomethyl) phenol, triethylene diamine, dimethyl benzylamine, or mixtures thereof. The amount of menthane diamine used should be about 1 equivalent per equivalent of epoxy ±20% and preferably ±10%. The amount of accelerator used should be about 0.2 to about 3% by weight of the total composition (including the accelerator) as less is ineffective and more may lower the properties. The preferred amount of accelerator is about 0.5 to about 2%. After the menthane diamine accelerator and any remaining epoxy resin is added to the oil-modified epoxy resin the composition should be used within about 9 hours.

The composition has a very low viscosity and can be used for potting compounds or for splicing wires or other insulation purposes. The composition may be cured at about 70° to about 100° C. If the cure is at about 75° C., about 4 to 6 hours are needed to complete the cure and if the cure is at 100° C., only about 2 to 4 hours are required. The composition prior to cure is a liquid and contains no solvent and no water.

The following examples illustrate this invention:

EXAMPLE 1

This example illustrates the preparation of the oil-modified epoxy resin. A mixture of 600 grams of raw linseed oil and 400 grams of a diglycidyl ether of bisphenol A having an epoxy equivalent weight of 185 to 192 sold by Shell Chemical Company as "Shell 828" was placed in a one liter resin reaction flask. To this mixture was added 0.19 grams of lithium ricinoleate. The reactor was fitted with a stirrer, Glas Col heating mantle, and a nitrogen gas sparging inlet. The stirred reactor contents were heated to a temperature of 215° C. and were held at this temperature while being nitrogen sparged until the epoxy equivalent weight of the reaction product was 500–600. The reaction time required for this to occur was about 75 minutes. The epoxy equivalent weight can be determined either by reaction with hydrochloric acid, cloud point temperature in kerosene-type aliphatic hydrocarbon solvent, or by Gardner-Holdt bubble tube viscosity measurement. Further information on the preparation of the oil-modified epoxy resin can be found in U.S. Pat. No. 3,974,113, herein incorporated by reference.

EXAMPLE 2

A mixture of 50 grams of the oil-modified epoxy resin prepared in Example 1 was added to 30 grams of Shell 828 resin in an aluminum dish. This mixture was hand-stirred and formed in a two-phase liquid. The mixture contained 0.094 equivalents of oil-modified epoxy resin and 0.158 equivalents of Shell 828. To this mixture was added 9.9 grams (0.252 equivalents) of menthane diamine. Upon stirring the resultant mixture the system became completely compatible. One gram of dimethyl benzylamine (also called benzyl dimethylamine) was then added and stirred in. This system was then poured into a 1" diameter test tube which has been coated with a silicon grease-mold release sold by Dow-Corning Corp. as "DC 7." A light brown, transparent, bubble-free casting was produced after heating for 12 hours at 100° C. The hardness of the casting was 40 on the Shore D scale. The casting was remarkably tough as was demonstrated by the fact that it could be struck repeatedly with a ball peen hammer without fracture while being supported on a steel anvil. The composition absorbed about 1 weight percent of water after having been boiled in water for 24 hours. It had excellent adhesion to untreated aluminum, and to appropriately primed Neoprene rubber. A 1:1 equivalence of menthane diamine to total EEW was used.

EXAMPLE 3

Other mixtures of oil-modified epoxy resin and Shell 828 resins ranging from 100 weight percent oil-modified epoxy resin to 10 weight percent oil-modified epoxy resin were cast. It was found that the hardness of the castings varied from a Shore A value of 20 with the pure oil epoxy resin to a Shore D value of 100 at 10 percent oil-modified epoxy resin. In all cases, the incompatibility that was found in the cold blend oil-modified epoxy resin mixtures was removed by the menthane diamine addition.

EXAMPLE 4

Two other nitrogenous bases were found to act as casting compatibility agents during the curing of the castings. These were tris (dimethylaminomethyl) phenol sold by Rohm and Haas as "DMP 30," and triethylene diamine sold by Howdry Process & Chemical Co. as "Dabco 33 LV," actually a 33 percent solution of triethylene diamine in dipropylene glycol.

EXAMPLE 5

Castings of a composition of Example 2 were made which contain 0.8 and 1.6 weight percent of dimethyl benzylamine, DMP 30, or Dabco 33 LV. It was found that at 75° C. the DMP 30 casting cured at both concentrations in 4 hours. The dimethyl benzylamine castings cured in 16 hours, the higher level Dabco casting cured in 12 hours, but the lower level Dabco remained two phased. It was also found that all of the catalyzed systems were still fluid and castable after 12 hours at room temperature.

EXAMPLE 6

In accordance with ASTM test D2519 (39) enameled copper wire coils were double dipped in one of the following compositions:
Composition A:
  50 g. oil-modified epoxy (see Example 1)
  50 g. "Shell 828"
  15.5 g. menthane diamine
  1 g. benzyl dimethylamine
Composition B:
  50 g. oil modified epoxy resin (see Ex. 1)
  70 g. "Shell 828"
  19.6 g. menthane diamine
  1 g. benzyl dimethylamine
Composition C:
  A high quality commercial impregnating varnish.

The compositions were cured by heating at 100° C. for 8 hours. The break values of the coils were measured by ASTM D2519(39). The following are the results of repeated tests.
Composition A 34.0, 33.6, 33.8, 28.6 and 31.6 pounds.

Composition B 45.0, 35.2, 40.0 and 43.0 pounds.

Composition C 29.4, 27.8, 24.8, 30.0 and 26.4 pounds.

The above results demonstrate the superior adhesion and flexural strength of coil treated with the compositions of this invention.

I claim:

1. A solventless anhydride-free liquid composition comprising:
    (A) an oil-modified epoxy resin having an EEW of about 300 to about 600 which comprises the reaction product of:
        (1) about 5 to about 50% of a triglyceride of a $C_{10}$ to $C_{20}$ fatty acid;
        (2) about 50 to about 95% of an epoxy resin averaging at least one aliphatic hydroxyl group per molecule, an ash content of less than 0.1%, and an acid content of less than 0.01%; and
        (3) about 0.01 to about 0.3 phr of a catalyst;
    (B) up to about 80% of a glycidyl ether of a phenol;
    (C) about 1 equivalent ±20%, per equivalent of epoxy resin, of menthane diamine; and
    (D) about 0.02 to about 3% of an accelerator for said menthane diamine.

2. A composition according to claim 1 wherein said accelerator is selected from the group consisting of tris (dimethylaminomethyl) phenol, triethylene diamine, dimethyl benzylamine, and mixtures thereof.

3. A composition according to claim 1 wherein said glycidyl ether of a phenol is a diglycidyl ether of bisphenol A.

4. A composition according to claim 3 wherein said diglycidyl ether of biphenol A has an EEW of about 185 to about 192.

5. A composition according to claim 1 wherein said triglyceride of a fatty acid is linseed oil.

6. A composition according to claim 1 wherein said catalyst is lithium riconoleate.

7. A composition according to claim 1 wherein the amount of said oil-modified epoxy resin is about 5 to about 95, the amount of said glycidyl ether of a phenol is about 5 to about 95, the amount of said menthane diamine is about 1 equivalent ±10% per equivalent of total epoxy resin, and the amount of said accelerator is about 0.5 to about 2%.

8. A composition according to claim 1 wherein said oil-modified epoxy resin has an EEW of about 500 to about 600 and the amount of said glycidyl ether of a phenol is about 30 to about 50%.

9. An article comprising an electrical conductor immersed in a composition according to claim 1.

10. An article according to claim 9 wherein said composition is cured.

11. A solventless liquid composition consisting essentially of
    (A) an oil-modified epoxy resin having an EEW of about 300 to about 600 which comprises the reaction product of:
        (1) about 5 to about 50% of a triglyceride of a $C_{10}$ to $C_{20}$ fatty acid;
        (2) about 50 to about 95% of an epoxy resin averaging at least one diphatic hydroxyl group per molecule, an ash content of less than 0.1%, and an acid content of less then 0.01%; and
        (3) about 0.01 to about 0.3 phr of a catalyst;
    (B) up to about 80% of a glycidyl ether of a phenol;
    (C) about 1 equivalent ±20% per equivalent of epoxy resin, of menthane diamine; and
    (D) about 0.2 to about 3% of an accelerator selected from the group consisting of tris (dimethylaminomethyl) phenol, triethylene diamine, dimethyl benzylamine, and mixtures thereof.

* * * * *